(12) United States Patent
Morikawa et al.

(10) Patent No.: US 7,976,173 B2
(45) Date of Patent: Jul. 12, 2011

(54) PROJECTOR AND CONTROL METHOD THEREFOR

(75) Inventors: Hiroyasu Morikawa, Kanagawa (JP); Toshiyuki Shirasu, Kanagawa (JP); Daizo Oka, Kanagawa (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 12/038,482

(22) Filed: Feb. 27, 2008

(65) Prior Publication Data

US 2008/0246928 A1 Oct. 9, 2008

(30) Foreign Application Priority Data

Mar. 9, 2007 (JP) ................................. 2007-060441

(51) Int. Cl.
*G03B 21/20* (2006.01)
*F21V 19/02* (2006.01)
(52) U.S. Cl. ......................................... 353/85; 362/285
(58) Field of Classification Search .................... 353/87, 353/85, 119, 121, 122; 362/282, 287, 418, 362/269, 270, 271, 285, 296.01, 296.06, 362/347, 341
See application file for complete search history.

(56) References Cited

U.S. PATENT DOCUMENTS

| | | | |
|---|---|---|---|
| 947,490 A | 1/1910 | Gwozdz | |
| 3,772,565 A | 11/1973 | Lenz et al. | |
| 5,153,419 A * | 10/1992 | Takahashi | 250/201.1 |
| 6,169,377 B1 | 1/2001 | Bryde et al. | |
| 6,184,632 B1 | 2/2001 | Kamata et al. | |
| 6,268,799 B1 | 7/2001 | Miyashita et al. | |
| 6,317,171 B1 * | 11/2001 | Dewald | 348/756 |
| 6,409,350 B1 | 6/2002 | Kakimoto et al. | |
| 6,448,715 B1 | 9/2002 | Fujiwara et al. | |
| 6,467,911 B1 | 10/2002 | Ueyama et al. | |
| 6,690,282 B2 | 2/2004 | Miyashita et al. | |
| 6,779,896 B2 | 8/2004 | Luerkens et al. | |
| 6,802,615 B2 | 10/2004 | Okada | |
| 6,827,453 B2 | 12/2004 | D'Alessio et al. | |
| 6,891,338 B2 | 5/2005 | Kubo | |

(Continued)

FOREIGN PATENT DOCUMENTS

CN 1461147 A 12/2003

(Continued)

OTHER PUBLICATIONS

U.S. Appl. No. 12/029,106, filed Feb. 11, 2008, Shirasu, et al.

(Continued)

*Primary Examiner* — Georgia Epps
*Assistant Examiner* — Ryan Howard
(74) *Attorney, Agent, or Firm* — Oblon, Spivak, McClelland, Maier & Neustadt, L.L.P.

(57) ABSTRACT

Disclosed herein is a projector for projecting an image to a screen, including: a lamp configured to emit light; an elliptic reflecting mirror configured to reflect and condense the light from the lamp; an image display device configured to modulate the light reflected and condensed by the elliptic reflecting mirror with image data corresponding to the image to convert the reflected light into image light; a projection lens disposed between the screen and the image display device and configured to project the image light from the image display device to the screen; and a position adjustment mechanism configured to displace the bright point of the lamp from a first focus of the elliptic reflecting mirror to adjust the position of the lamp so as to decrease the effective light amount of the image display device.

16 Claims, 11 Drawing Sheets

U.S. PATENT DOCUMENTS

| | | |
|---|---|---|
| 6,956,490 B2 | 10/2005 | Childers |
| 6,982,529 B2 | 1/2006 | Belliveau |
| 7,006,004 B2 | 2/2006 | Miyashita et al. |
| 7,045,984 B2 * | 5/2006 | Gonschor ............... 318/480 |
| 7,083,287 B2 * | 8/2006 | Pate ............... 353/85 |
| 7,088,058 B2 | 8/2006 | Shiota et al. |
| 7,377,658 B2 | 5/2008 | Jayaram et al. |
| 7,391,475 B2 | 6/2008 | Pate et al. |
| 7,589,695 B2 | 9/2009 | Tanaka |
| 2002/0005697 A1 | 1/2002 | Morgan et al. |
| 2003/0214638 A1 | 11/2003 | Okada |
| 2003/0227765 A1 | 12/2003 | Kubo |
| 2004/0080715 A1 | 4/2004 | Miyashita et al. |
| 2004/0263800 A1 | 12/2004 | Childers |
| 2005/0024219 A1 | 2/2005 | Childers |
| 2005/0110958 A1 | 5/2005 | Schwartz et al. |
| 2005/0243287 A1 * | 11/2005 | Pate et al. ............... 353/87 |
| 2006/0087622 A1 | 4/2006 | Brown |
| 2006/0170880 A1 | 8/2006 | Dambach et al. |
| 2006/0170882 A1 | 8/2006 | Schwartz et al. |
| 2006/0238722 A1 | 10/2006 | Jayaram et al. |
| 2007/0075647 A1 | 4/2007 | Tsintzouras et al. |
| 2007/0103650 A1 | 5/2007 | Takagi et al. |
| 2008/0218701 A1 | 9/2008 | Shirasu et al. |
| 2008/0225241 A1 | 9/2008 | Chen et al. |
| 2008/0246927 A1 | 10/2008 | Inoue et al. |
| 2008/0291404 A1 | 11/2008 | Shirasu et al. |
| 2008/0297736 A1 | 12/2008 | Shirasu et al. |
| 2009/0122276 A1 | 5/2009 | Ito |
| 2010/0110395 A1 | 5/2010 | Kotani et al. |
| 2010/0128226 A1 | 5/2010 | Shibasaki |

FOREIGN PATENT DOCUMENTS

| | | |
|---|---|---|
| EP | 1 740 022 A1 | 1/2007 |
| JP | 63-243930 | 10/1988 |
| JP | 5-260423 | 10/1993 |
| JP | 2000-314919 | 11/2000 |
| JP | 2001-21994 | 1/2001 |
| JP | 2002-311503 | 10/2002 |
| JP | 2002-357866 | 12/2002 |
| JP | 2003-324670 | 11/2003 |
| JP | 2003-348496 | 12/2003 |
| JP | 2004-85749 | 3/2004 |
| JP | 2004-239933 | 8/2004 |
| JP | 2004-309543 | 11/2004 |
| JP | 2005-19137 | 1/2005 |
| JP | 2005-148123 | 6/2005 |
| JP | 2005-181591 | 7/2005 |
| JP | 2006-3403 | 1/2006 |
| JP | 2006-120654 | 5/2006 |
| JP | 2006-173022 | 6/2006 |
| JP | 2006-185924 | 7/2006 |
| WO | WO 2005/043955 A2 | 5/2005 |
| WO | WO 2005/043955 A3 | 5/2005 |

OTHER PUBLICATIONS

U.S. Appl. No. 12/035,835, filed Feb. 22, 2008, Shirasu, et al.
U.S. Appl. No. 12/166,461, filed Jul. 2, 2008, Oka.
Notice of Allowability mailed Aug. 23, 2010, in co-pending U.S. Appl. No. 12/037,528.
Notice of Allowability mailed Sep. 3, 2010, in co-pending U.S. Appl. No. 12/037,330.
Office Action issued Feb. 19, 2009, in Japan Patent Application No. 2007-060440.
Office Action mailed Jun. 11, 2010, in co-pending U.S. Appl. No. 12/029,106.
Notice of Allowance mailed Sep. 20, 2010, in co-pending U.S. Appl. No. 12/166,461.
Office Action mailed Oct. 21, 2010, in co-pending U.S. Appl. No. 12/035,835.
Extended European Search Report issued Jul. 7, 2008, in Application No. 08250787.2-2206.

* cited by examiner

PROJECTOR AND CONTROL METHOD THEREFOR

CROSS REFERENCES TO RELATED APPLICATIONS

The present invention contains subject matter related to Japanese Patent Application JP 2007-060441 filed in the Japan Patent Office on Mar. 9, 2007, the entire contents of which being incorporated herein by reference.

BACKGROUND OF THE INVENTION

1. Field of the Invention

This invention relates to a projector and a control method therefor, and more particularly to a projector and a control method therefor suitable for use where light is emitted from a lamp.

2. Description of the Related Art

In recent years, together with development of the image display technique, a projector which can be applied to the field of digital cinemas, that is, a projector which can be used for applications of screening of a movie in a movie theater, has appeared. One of projectors of the type described is disclosed, for example, in Japanese Patent Laid-Open No. Hei 5-260423.

As one of operation systems for a projector, a light valve system is available which uses a light valve apparatus such as a liquid crystal light valve apparatus to modulate and project light from a light source. Further, as a method for changing the brightness of a projected image from a projector which uses a light valve apparatus of fixed pixels, a method of varying the brightness of a light source such as a lamp is generally known.

SUMMARY OF THE INVENTION

However, there is a limitation if it is tried to adjust the brightness only by varying the input power using the same lamp, and there is a problem that the width of variation of the peak luminance may not be expanded simply.

Therefore, it is demanded to provide a projector and a control method therefor wherein an existing mechanism can be utilized to expand the width of the variation of the peak luminance simply.

According to an embodiment of the present invention, there is provided a projector for projecting an image to a screen, including a lamp configured to emit light, an elliptic reflecting mirror configured to reflect and condense the light from the lamp, an image display device configured to modulate the light reflected and condensed by the elliptic reflecting mirror with image data corresponding to the image to convert the reflected light into image light, a projection lens disposed between the screen and the image display device and configured to project the image light from the image display device to the screen, and a position adjustment mechanism configured to displace the bright point of the lamp from a first focus of the elliptic reflecting mirror to adjust the position of the lamp so as to decrease the effective light amount of the image display device.

The position adjustment mechanism may move the bright point of the lamp on an optical axis of the elliptic reflecting mirror. Or, the position adjustment mechanism may move the bright point of the lamp in a direction different from that of an optical axis of the elliptic reflecting mirror.

The position adjustment mechanism may adjust the position of the lamp when the aspect ratio of the image displayed on the screen changes.

According to a different embodiment of the present invention, there is provided a control method for the projector described above. In particular, according to the different embodiment of the present invention, there is provided a control method for a projector for projecting an image to a screen, the projector including a lamp configured to emit light, an elliptic reflecting mirror configured to reflect and condense the light from the lamp, an image display device configured to modulate the light reflected and condensed by the elliptic reflecting mirror with image data corresponding to the image to convert the reflected light into image light, a projection lens disposed between the screen and the image display device and configured to project the image light from the image display device to the screen, and a position adjustment mechanism configured to adjust the position of the lamp, the control method including the step, executed by the control circuit, of displacing the bright point of the lamp from a first focus of the elliptic reflecting mirror to adjust the position of the lamp so as to decrease the effective light amount of the image display device.

With the projector and the control method for a projector, the width of the variation of the peak luminance can be expanded simply utilizing an existing mechanism.

DETAILED DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 9:
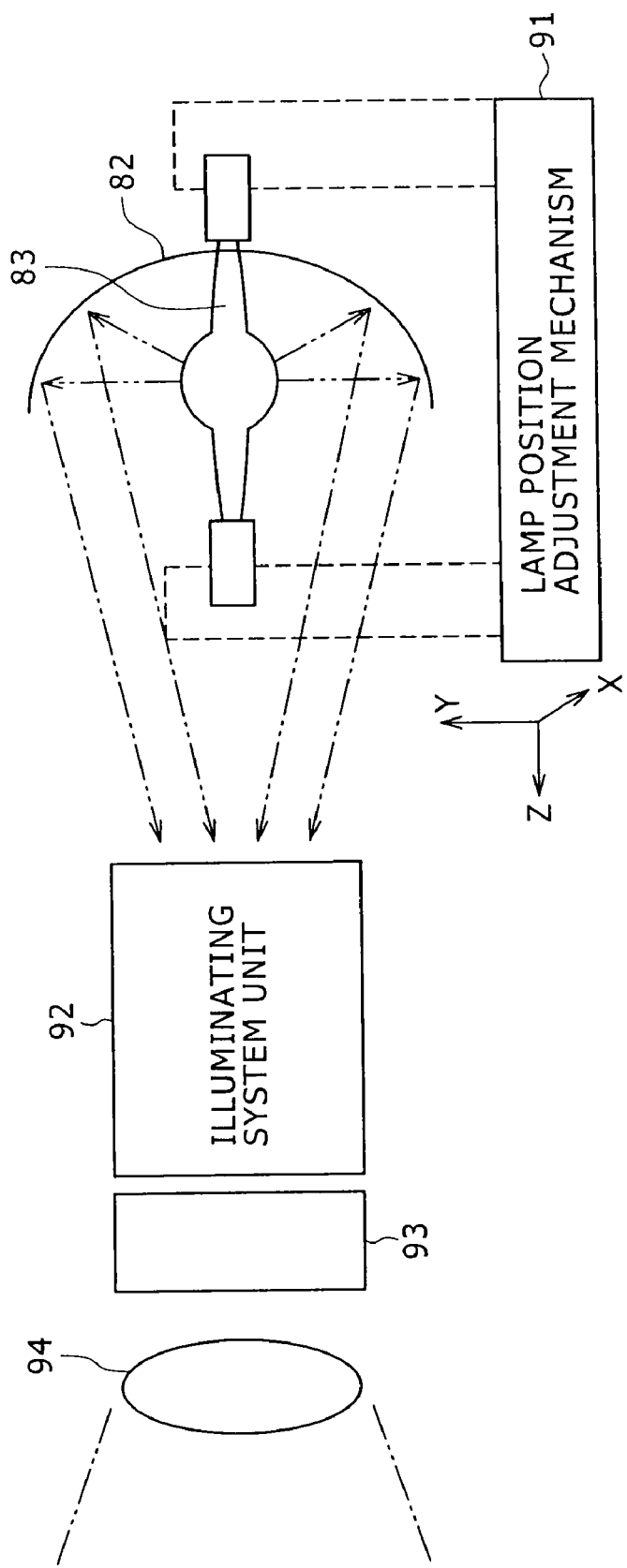
FIG. 9 shows a lamp position adjustment mechanism according to an exemplary embodiment.

According to an embodiment of the present invention, there is provided a projector (for example, a projector 33 shown in FIG. 4 which can be installed in movie theaters 11A to 11N shown in FIG. 1) for projecting an image to a screen (for example, a screen 34 shown in FIG. 1), including a lamp (for example, a lamp 83 shown in FIG. 9 which has a shape shown in FIG. 6) configured to emit light, an elliptic reflecting mirror (for example, an elliptic reflecting mirror 82 shown in FIG. 9) configured to reflect and condense the light from the lamp, an image display device (for example, a liquid crystal light valve apparatus 93 shown in FIG. 9) configured to modulate the light reflected and condensed by the elliptic reflecting mirror with image data corresponding to the image to convert the reflected light into image light, a projection lens (for example, a projection lens 94 shown in FIG. 9) disposed between the screen and the image display device and configured to project the image light from the image display device to the screen, and a position adjustment mechanism (for example, a lamp position adjustment mechanism 91 shown in FIG. 9) configured to displace the bright point of the lamp from a first focus of the elliptic reflecting mirror to adjust the position of the lamp so as to decrease the effective light amount of the image display device.

Figure 11:
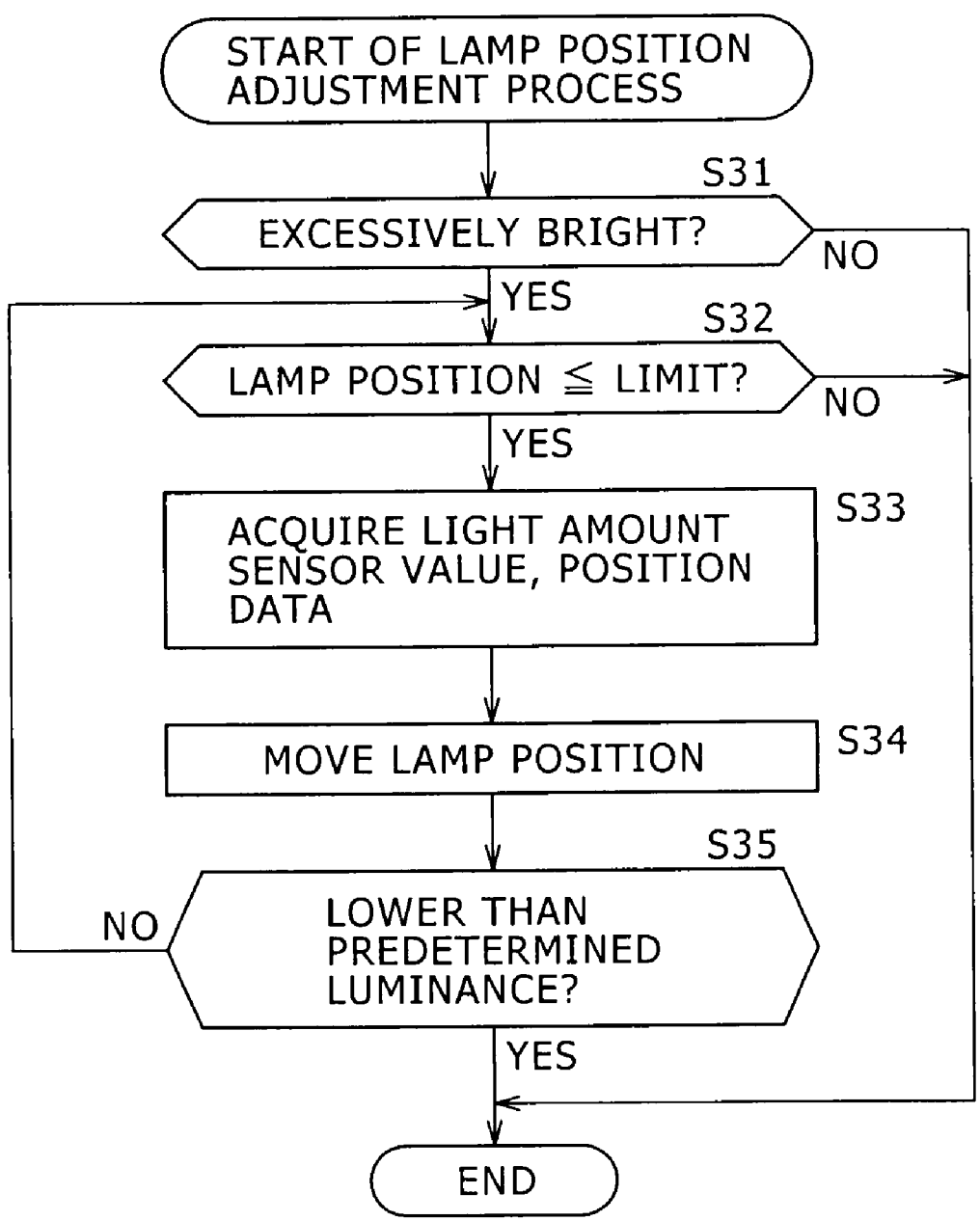
FIG. 11 is a flow chart of a lamp position adjustment process according to an exemplary embodiment.

The position adjustment mechanism may move the bright point of the lamp on an optical axis of the elliptic reflecting mirror (for example, a process at step S34 of FIG. 11). Or, the position adjustment mechanism may move the bright point of the lamp in a direction different from that of an optical axis of the elliptic reflecting mirror (for example, a process at step S34 of FIG. 11).

The position adjustment mechanism may adjust the position of the lamp when the aspect ratio of the image displayed on the screen changes (for example, a lamp position adjustment process of FIG. 11).

Figure 4:
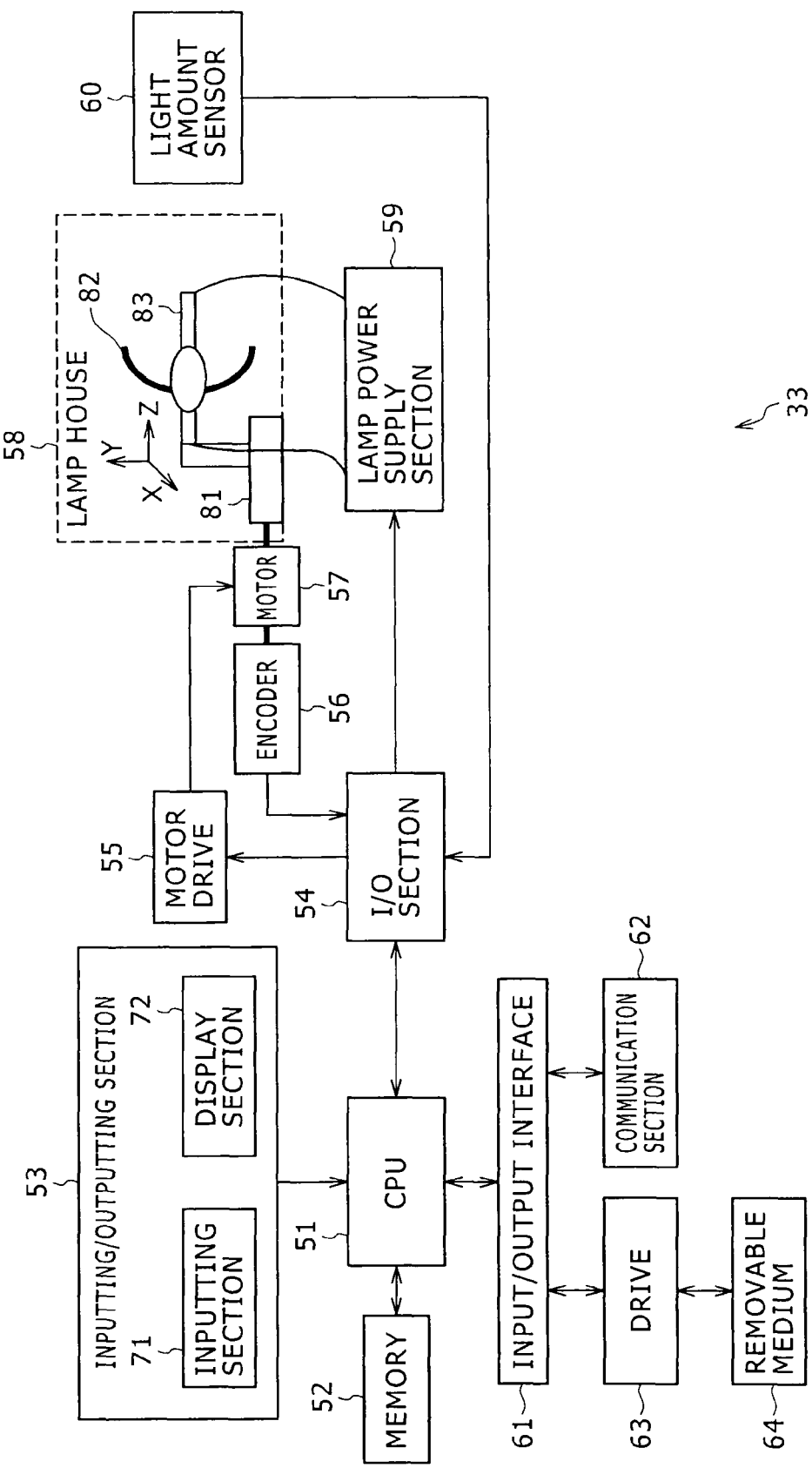
FIG. 4 is a block diagram of a system according to the present invention that includes a lamp house that houses lamps used for a projector.

According to a different embodiment of the present invention, there is provided a control method for the position adjustment mechanism of the projector described above (for example, a method corresponding to a lamp position adjustment process of FIG. 11 from among processes executed by the CPU 51 of the projector 33 of FIG. 4).

In the following, a preferred embodiment of the present invention is described with reference to the accompanying drawings.

Figure 1:
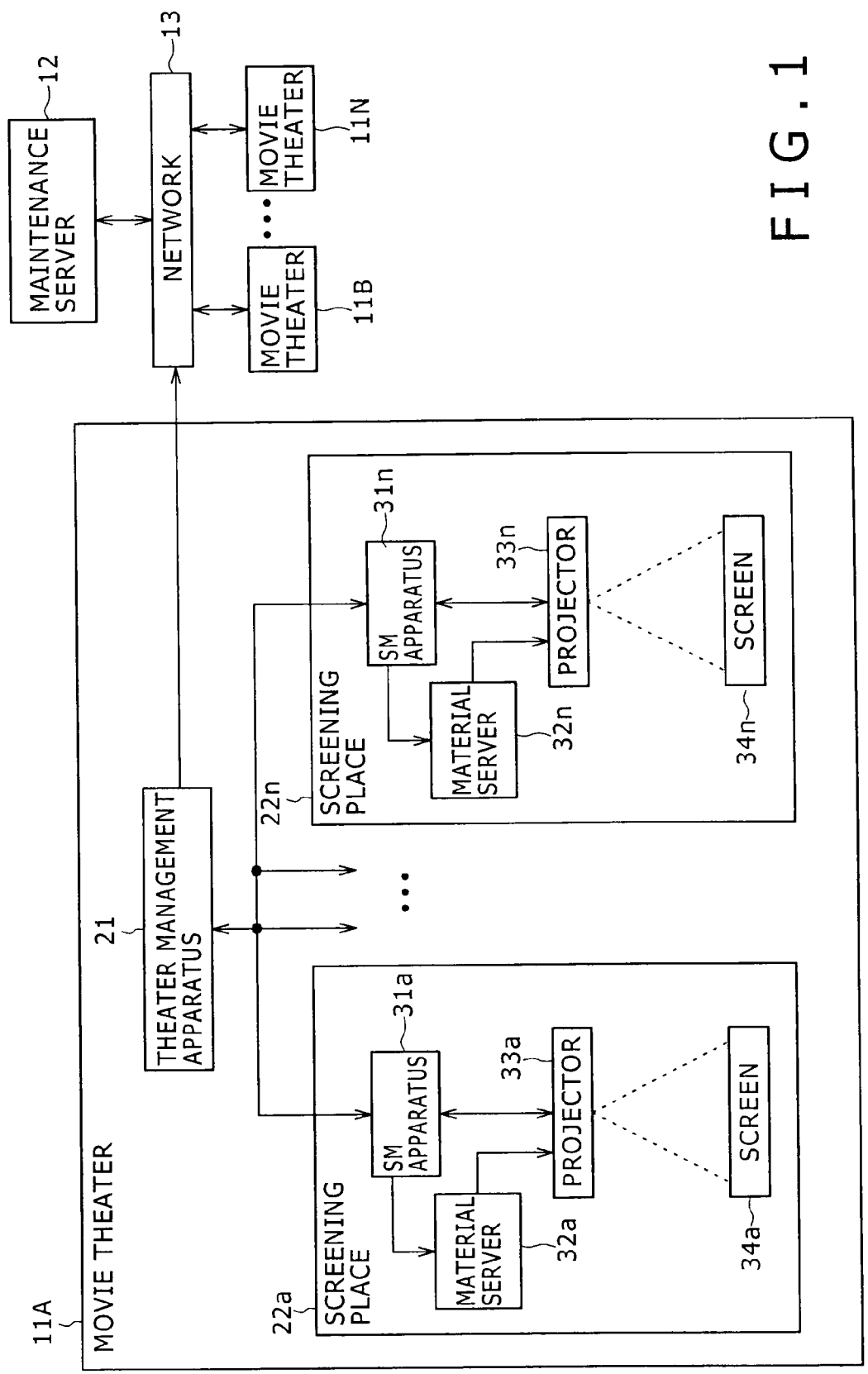
FIG. 1 is a block diagram of an information processing system used with a movie theater according to an exemplary embodiment.

FIG. 1 shows an example of a configuration of an information processing system to which the present invention is applied wherein it is applied to the field of digital cinemas.

Referring to FIG. 1, the information processing system shown includes various apparatus hereinafter described which are installed in movie theaters 11A to 11N and a maintenance server 12 connected to each other by a predetermined network 13 such as the Internet. The maintenance server 12 here is an apparatus used by a person who provides maintenance of the apparatus installed in the movie theaters 11A to 11N as a service.

The movie theater 11A includes a plurality of screening places 22a to 22n so that a plurality of movies can be shown concurrently. In order to collectively manage the screening places 22a to 22n, a theater management (TM) apparatus 21 is installed in the movie theater 11A.

Further, a screen management (SM) apparatus 31a, a material server 32a, a projector 33a and a screen 34a are provided in the screening place 22a.

Similarly, a screen management apparatus 31n, a material server 32n, a projector 33n and a screen 34n are provided in the screening place 22n. Also any other screening place 22k not shown includes a screen management apparatus 31k, a material server 32k, a projector 33k and a screen 34k not shown. Here, k is an alphabet of a small letter between a and n.

It is to be noted that, in the following description, where there is no necessity to individually distinguish the screening places 22a to 22n from one other, any of them is referred to simply as screening place 22. Further, where the screening place 22k is referred to simply as screening place 22, also the screen management apparatus 31k, material server 32k, projector 33k and screen 34k are individually referred to as screen management apparatus 31, material server 32, projector 33 and screen 34, respectively.

The screen management apparatus 31 carries out management of the entire screening place 22 and controls the other apparatus in the screening place 22, that is, the material server 32, projector 33 and so forth. Further, the screen management apparatus 31 communicates with the theater management apparatus 21 to supply and receive various information to and from the theater management apparatus 21.

The material server 32 provides digital data of a movie or material to be screened in the screening place 22 to the projector 33.

The projector 33 projects an image corresponding to the digital data supplied thereto from the material server 32 to the screen 34. The movie is screened on the screen 34 thereby.

Also the other movie theaters 11B to 11N have one or more screening places 22, in each of which a screen management apparatus 31, a material server 32, a projector 33 and a screen 34 are provided.

The information processing system of FIG. 1 is applied to the field of digital cinemas as described hereinabove. In the field of digital cinemas, standards called DCI Spec are defined by an organization called DCI (Digital Cinema Initiatives). According to the standards, it is written expressly that, as an image parameter to be referred to, "The white peak luminance should be 48 cd/m$^2$ (14 ft-L) at the center of the screen." Since 14 ft-L 48 cd/m$^2$, a brightness provided by approximately 48 candles is demanded per 1 m$^2$ at the center of the screen 34. In other words, it is necessary to normally keep the luminance or brightness of an image projected on the screen 34 fixed.

On the other hand, the screen 34 may have a size selected from among various types of size depending upon the volume of the screening place 22 and so forth.

Therefore, it is necessary to adopt, as a light source of the projector 33, an optimum lamp which can satisfy the DCT Spec such as, for example, a xenon lamp in accordance with the size of the screen 34 of an object of projection.

Also as regards the angle of field for a movie, various types which are different in aspect ratio such as, for example, scope and Vista are available. Accordingly, it sometimes becomes necessary to change over the angle of field for use in the same screening place 22, that is, for use on the same screen 34, from one to another one of the various angles of field. In this instance, it is necessary to change the magnification in zooming of the lens of the projector 33. Further, it is necessary to change the power or input watt of the lamp in response to the change of the zooming magnification in order that the luminance or brightness of an image on the screen 34 may be kept fixed as described hereinabove. As a result, it is necessary to assure the light amount gain of the lamp at a fixed amount.

Figure 2:
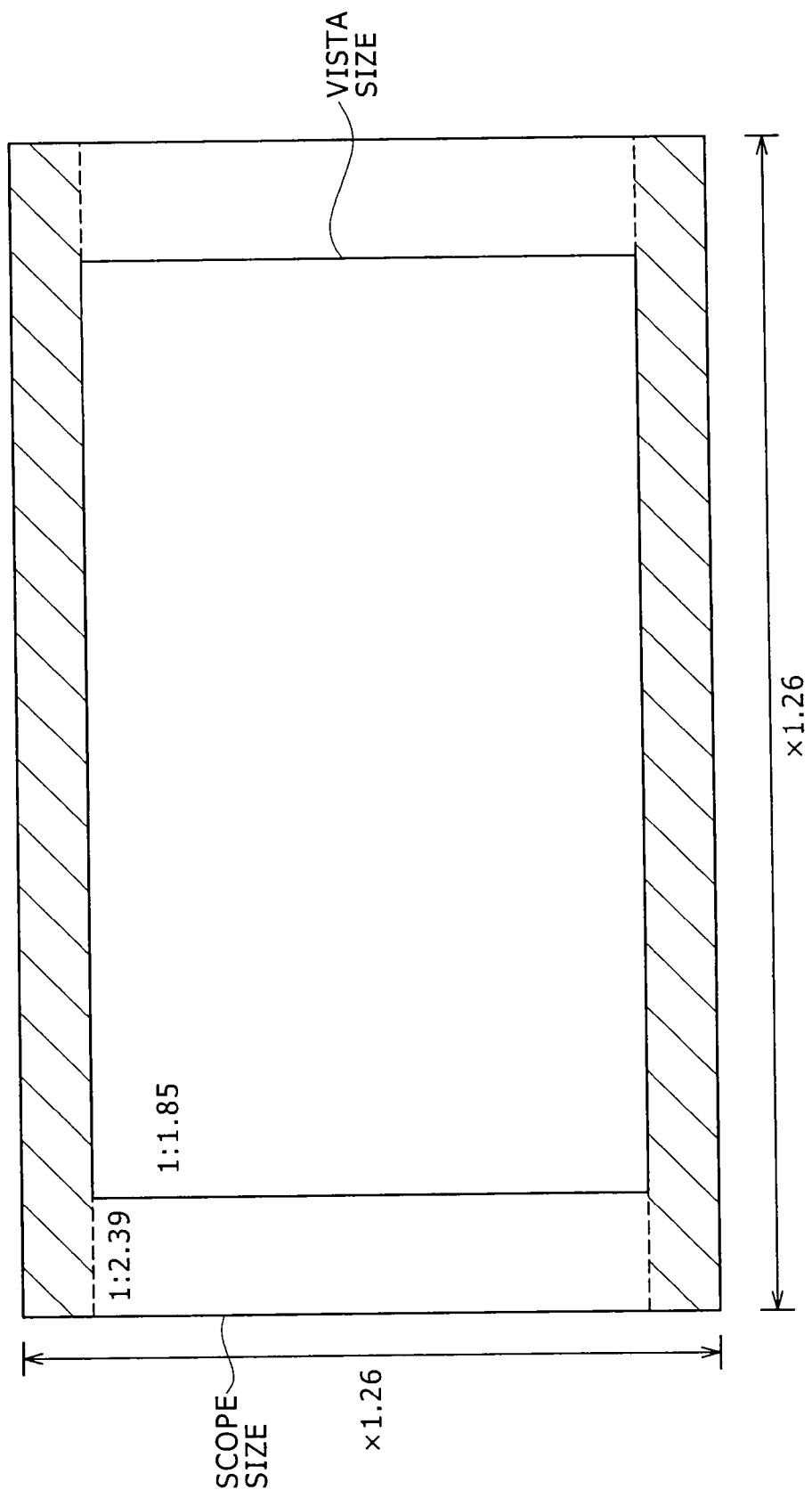
FIG. 2 is a diagram of an elongated screen size demonstrating a particular aspect ration.

Referring to FIG. 2, the vista size is a horizontally elongated screen size having an aspect ratio of approximately 1:1.66, in the example of FIG. 2, an aspect ratio of approximately 1:1.85. As a representative one of such vista sizes, a vista size of 1:1.66 (European standards), another vista size of 1:1.85 (U.S. standards) and so forth are available. Meanwhile, the scope size is a horizontally elongated screen size having an aspect ratio of 1:2 or more, in the example of FIG. 2, an aspect ratio of 1:2.39. As a representative one of such scope sizes, the cinema scope size (registered trademark) having an aspect ratio of 1:2.35 and so forth are available.

Since the scope size is obtained, for example, by multiplying the vista size by 1.26 in both of the vertical direction and horizontal direction, the scope size has a magnitude equal to 1.6 times ($\approx 1.26 \times 1.26$) the vista size. Accordingly, upon changeover from the vista size to the scope size, if the lamp power is increased to 1.6 times, then the luminance per unit area becomes fixed. For example, if the lamp power for the vista size is 50%, then 1.6 times the lamp power, that is, 80%, are requisite as the lamp power for the scope size. It is to be noted that, although upper and lower portions of the screen of the scope size indicated by slanting lines are not observable as seen in FIG. 2, as viewed from the lamp side, power including that for the slanting line portions is requisite.

Further, since it is necessary to keep the luminance or brightness of an image on the screen 34 fixed as described hereinabove, it is necessary to adopt a lamp which can cope with a change in power in terms of minimum watt and maximum watt as input ratings (such input ratings are hereinafter referred to as lamp size) and to carry out suitable setting also on the driving side for the lamp. In other words, there is the probability that the projector 33 may incorporate lamps of various lamp sizes.

Figure 3:
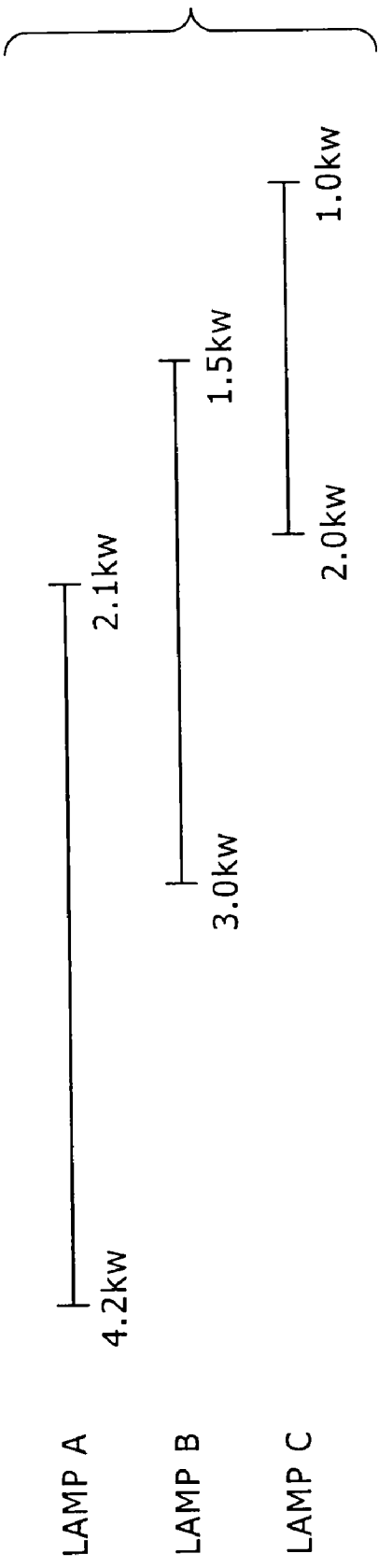
FIG. 3 shows example wattage output for three different lamps according to an exemplary embodiment.

For example, such three different lamps as seen in FIG. 3 are incorporated in the projector 33. Referring to FIG. 3, the lamp A is driven within a range between minimum watt of 2.1 kW and maximum watt of 2.4 kW. Similarly, the lamp B is driven within another range between minimum watt of 1.5 kW and maximum watt of 3.0 kW, and the lamp C is driven within a further range between minimum watt of 1.0 kW and maximum watt of 2.0 kW.

Figure 6:
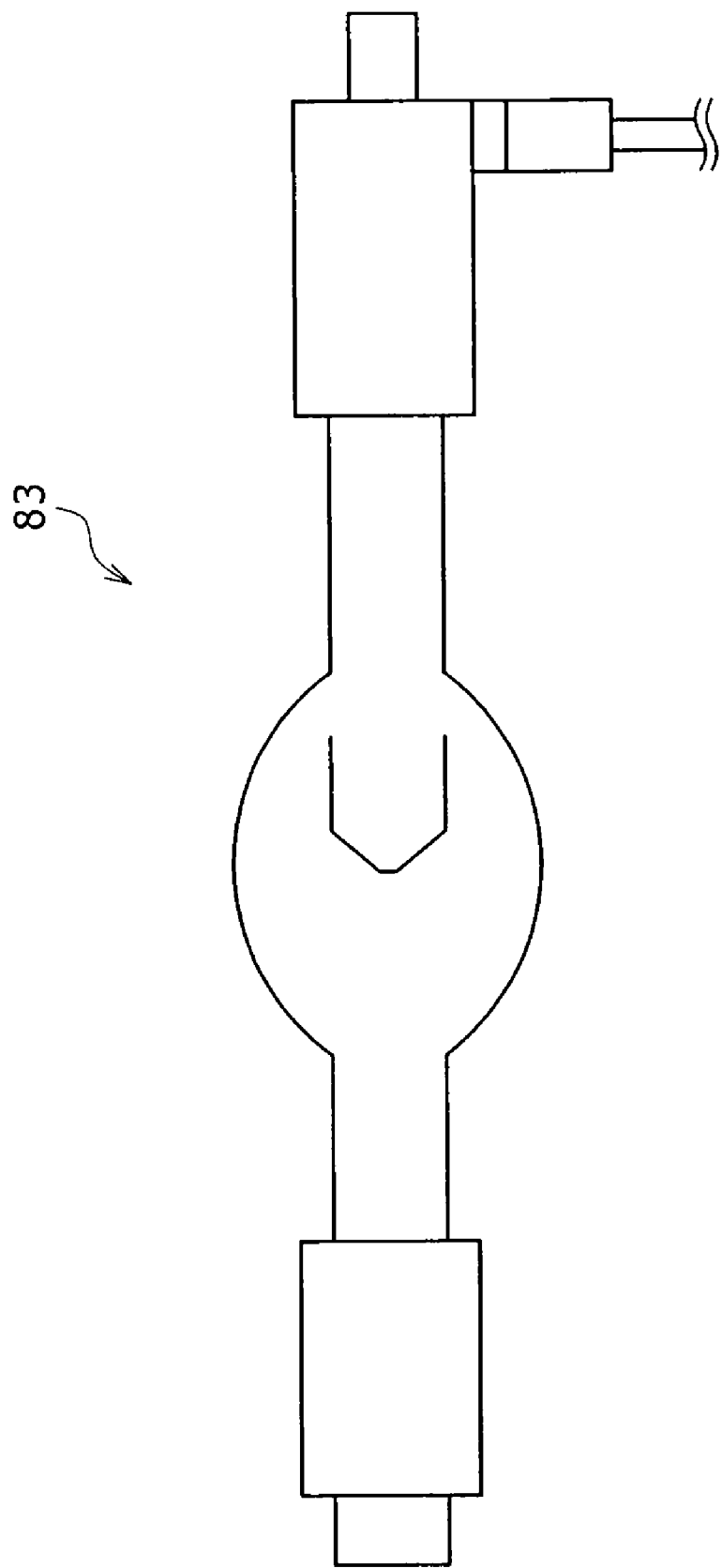
FIG. 6 shows a side view of a lamp according to an exemplary embodiment.

In particular, since a lamp is mounted on a predetermined lamp house, in the present embodiment, in a lamp house 58 shown in FIG. 4, the three lamps mentioned hereinabove have a same or similar shape in order to assure a function, for example, in the present embodiment, have such a shape as seen in FIG. 6. No particular prescriptions are available for the lamp size, and there is the possibility that lamps of various lamp sizes may be circulated on the market. Particularly in such a case that the movie theaters 11A to 11N are located discretely at remote distances, lamps of lamp manufactures or makers in the districts are adopted frequently. In such an instance, lamps of various lamp sizes different in different districts may be distributed on the market with higher possibility. Accordingly, even if the projector 33 projects an image to the screen 34 of the same size, lamps of different lamp sizes are adopted as the lamp to be incorporated in the movie theaters 11A to 11N.

In this manner, the lamp for use with a projector in the field of digital cinemas involves a situation unique to the field. As a result, a movie theater in which an existing projector is used suffers from such various problems as described below.

For example, even if changeover between the scope size and the vista size is carried out, it is necessary to always keep the luminance or brightness of an image projected on the screen 34 fixed. In this instance, in order to assure a fixed luminance, for example, it is necessary to assure the light amount gain of the lamp at 1.6 as described hereinabove. However, since only 2.0 (50% to 100%) is available as the input gain of a lamp in the past, it is necessary to normally use low input power, and therefore, there is a problem that a sufficient life has to be assured even where the input power is low. Further, a flicker phenomenon has a nature that it begins with low input power and ends if the power of the lamp is raised. For example, the flicker phenomenon begins with lower power of 50% and ends when the input power is raised to 60%. Therefore, if low input power is always used, then a flicker phenomenon is likely to occur. In words, lower power input is requisite in order to assure the light amount gain of the lamp at 1.6, and this gives rise to a problem of occurrence of a flicker phenomenon at lower input power. Such a problem as just described is hereinafter referred to as flicker phenomenon problem.

Further, while, for example, in order to keep the luminance or brightness of an image on the screen 34 fixed, it is necessary to adjust the amount of light to be emitted from the lamp, a method of adjusting the electric power amount of the light source is available as a method for the light amount adjustment. Where the electric power amount of the light source is adjusted, generally the adjustment is carried out between maximum power and approximately one half the maximum power. In particular, where the maximum value and the minimum value of the adjustment range of the light amount are represented by 100% and 0%, respectively, the adjustment range is given by 50% to 100%. For example, the adjustment range for such lamps as illustrated in FIG. 3 is a range between 2.1 and 4.2 kW for the lamp A; another range between 1.5 and 3.0 kW for the lamp B; and a further range between 1.0 and 2.0 kW for the lamp C. Therefore, the lamp A, lamp B and lamp C may not emit light with power lower than 2.1 kW, 1.5 kW and 1.0 kW, respectively. In other words, there is a problem that each of the lamp A, lamp B and lamp C may not emit light of a brightness corresponding to power outside the adjustment range from 50% to 100%. Further, in addition to the method of adjusting the power amount of the light source, also a method of adjusting the light amount by opening/closing of an iris is known. However, although addition of an optical iris mechanism theoretically makes it possible to set the adjustment range of the light amount to a range from 0% to 100%, since the optical iris mechanism is newly mounted, it gives rise to a new problem that some physical restriction is caused by parts to be added and a rise of the cost is invited.

Therefore, in the information processing system of FIG. 1 to which the present invention is applied, the projector 33 which can solve the various problems described above is installed in each screening place 22. In other words, the projector 33 is a form of a projector to which the present invention is applied. An example of a configuration of the projector 33 is shown in FIG. 4.

Referring to FIG. 4, the projector 33 includes a central processing unit (CPU) 51, a memory 52, an inputting/outputting section 53, an input/output (I/O) section 54, a motor drive 55, an encoder 56, a motor 57, a lamp house 58, a lamp power supply section 59, a light amount sensor 60, an input/output interface 61, a communication section 62 and a drive 63.

The CPU 51 executes various processes in accordance with programs and so forth recorded in the memory 52. The memory 52 suitably stores also data and so forth necessary for the CPU 51 to execute various processes.

Also the inputting/outputting section 53, I/O section 54 and input/output interface 61 are connected to the CPU 51.

The inputting/outputting section 53 includes an inputting section 71 formed, for example, from a touch panel for being operated by a user such as an operator, and a display section 72 formed from a display unit and so forth for displaying the substance of such operation and so forth.

The I/O section 54 repeats various kinds of information between the CPU 51 and the motor drive 55, encoder 56, lamp power supply section 59 or light amount sensor 60.

The lamp house 58 for receiving a lamp 83 mounted thereon has an electric power section 81 provided for movement in three directions along X, Y and Z axes illustrated in FIG. 4. The motor 57 and the encoder 56 which generates a pulse in response to the rotational angle of a movable rotary shaft of the electric power section 81 are mechanically connected to the movable rotary shaft. An elliptic reflecting mirror 82 for suppressing spreading of light from the lamp 83 to irradiate the light to a remote plate is provided on the lamp house 58 in addition to the electric power section 81 and the lamp 83.

The CPU 51 controls the motor drive 55 through the I/O section 54 to drive the motor 57. When the motor 57 is driven, the electric power section 81 is moved in the three axis directions in FIG. 4 so that also the lamp 83 mounted on the lamp house 58 is moved. At this time, a pulse signal is generated by the encoder 56 in response to the amount of movement of the electric power section 81 and read by the CPU 51 through the I/O section 54. Consequently, the CPU 51 can acquire information regarding the position of the lamp 83.

The light amount sensor 60 is provided at a position at which it can measure the amount of light emitted from the lamp 83 and detects the amount of light. The CPU 51 controls the light amount sensor 60 through the I/O section 54 to acquire information regarding the amount of light measured by the light amount sensor 60.

The lamp power supply section 59 is a power supply which can drive a plurality of different kinds of lamps 83. The lamp power supply section 59 provides appropriate driving power to the lamp 83 mounted on the lamp house 58 under the control of the CPU 51 through the I/O section 54.

The communication section 62 and the drive 63 are connected to the input/output interface 61. The communication section 62 controls communication carried out with a different apparatus such as the screen management apparatus 31 or material server 32 shown in FIG. 1. The form of communication in this instance is not limited particularly, but may be wired communication or wireless communication. Further, the communication may be carried out through direct connection or carried out through a network including the Internet.

Further, the communication section 62 may acquire a program from the outside under such communication control and store the acquired program into the memory 52.

The drive 63 drives, when a removable medium 64 such as a magnetic disk, an optical disk, a magneto-optical disk or a semiconductor memory is loaded therein, the removable medium 64 to acquire a program, data and so forth recorded on the removable medium 64. The acquired program and data are transferred to and stored into the memory 52 as occasion demands.

Figure 5:
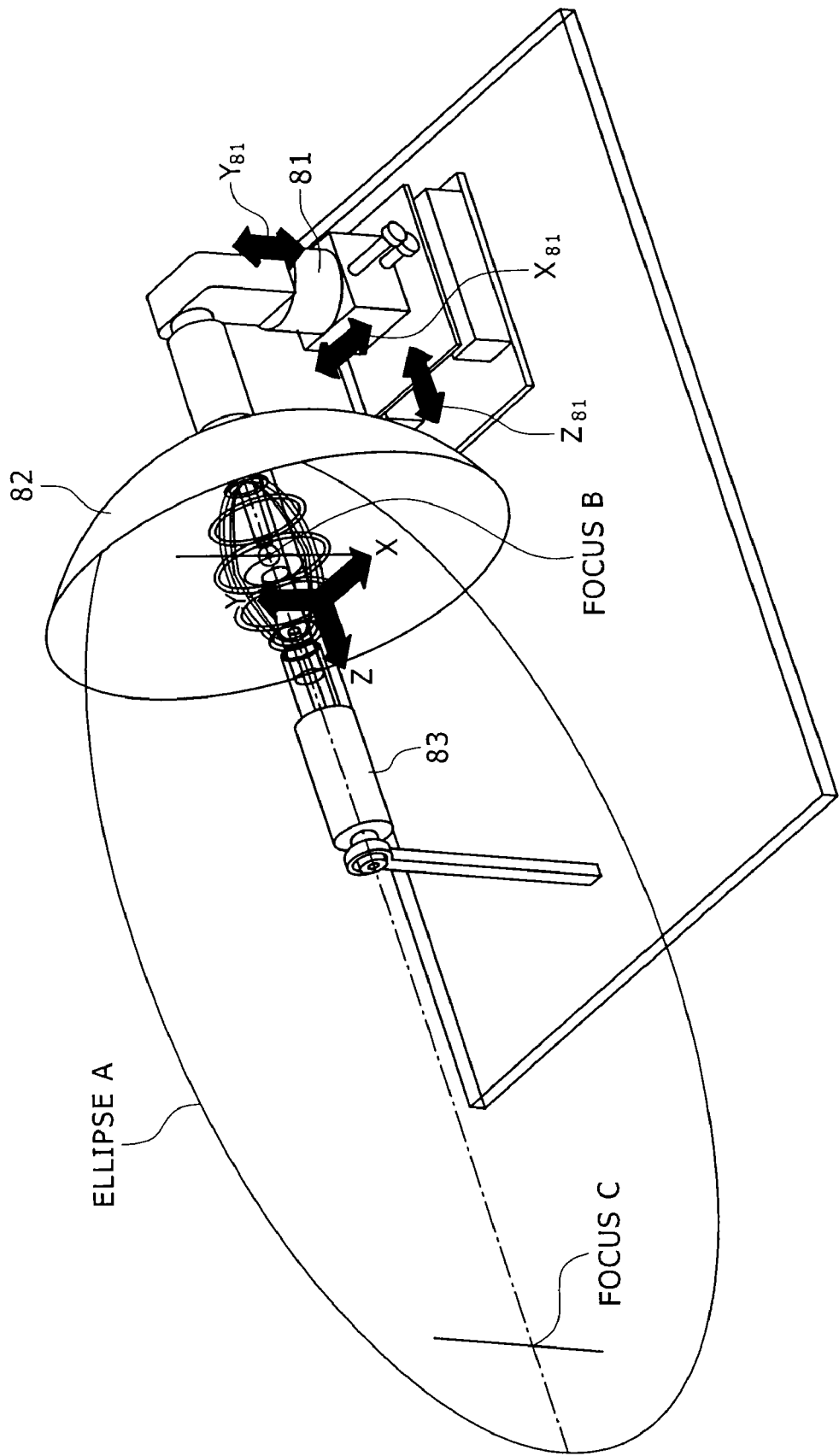
FIG. 5 is a profile view of the lamp house previously described in FIG. 4.

Incidentally, the lamp house 58 shown in FIG. 4 has such an internal configuration as, for example, shown in FIG. 5.

Referring to FIG. 5, the lamp 83 serving as a light source is mounted on the lamp house 58 in such a manner as to be secured to the electric power section 81. Consequently, if the electric power section 81 is moved in three directions indicated by $X_{81}$, $Y_{81}$ and $Z_{81}$ in FIG. 5, then the lamp 83 is moved in the three axial directions of the X, Y and Z axes in FIG. 5 corresponding to the directions of the movement of the electric power section 81.

In the present embodiment, the lamp 83 has, for example, such a shape as seen in FIG. 6. In the present embodiment, any lamp which may possibly be incorporated as the lamp 83 in the projector 33 (exchangeability) has a shape same as that shown in FIG. 6. It is to be noted, however, that such lamps may possibly have various lamp sizes. Further, the shape of the lamp 83 shown in FIG. 6 is a mere example but is not limited particularly only if it allows the lamp 83 to be mounted on the lamp house 58. In other words, the lamp house 58 in the present embodiment casually has a structure which allows the lamp 83 of the shape shown in FIG. 6 to be mounted on the lamp house 58.

Referring back to FIG. 5, the elliptic reflecting mirror 82 is, for example, an elliptic reflecting mirror or elliptic mirror having an elliptic reflecting face which changes the advancing direction of a light beam from the lamp 83 and condenses light from a bright spot of the lamp 83 having a focus B as a first focus on the major axis of such an ellipse A as seen in FIG. 5 on another focus C as a second focus which is on the major axis mentioned above.

Figure 7:
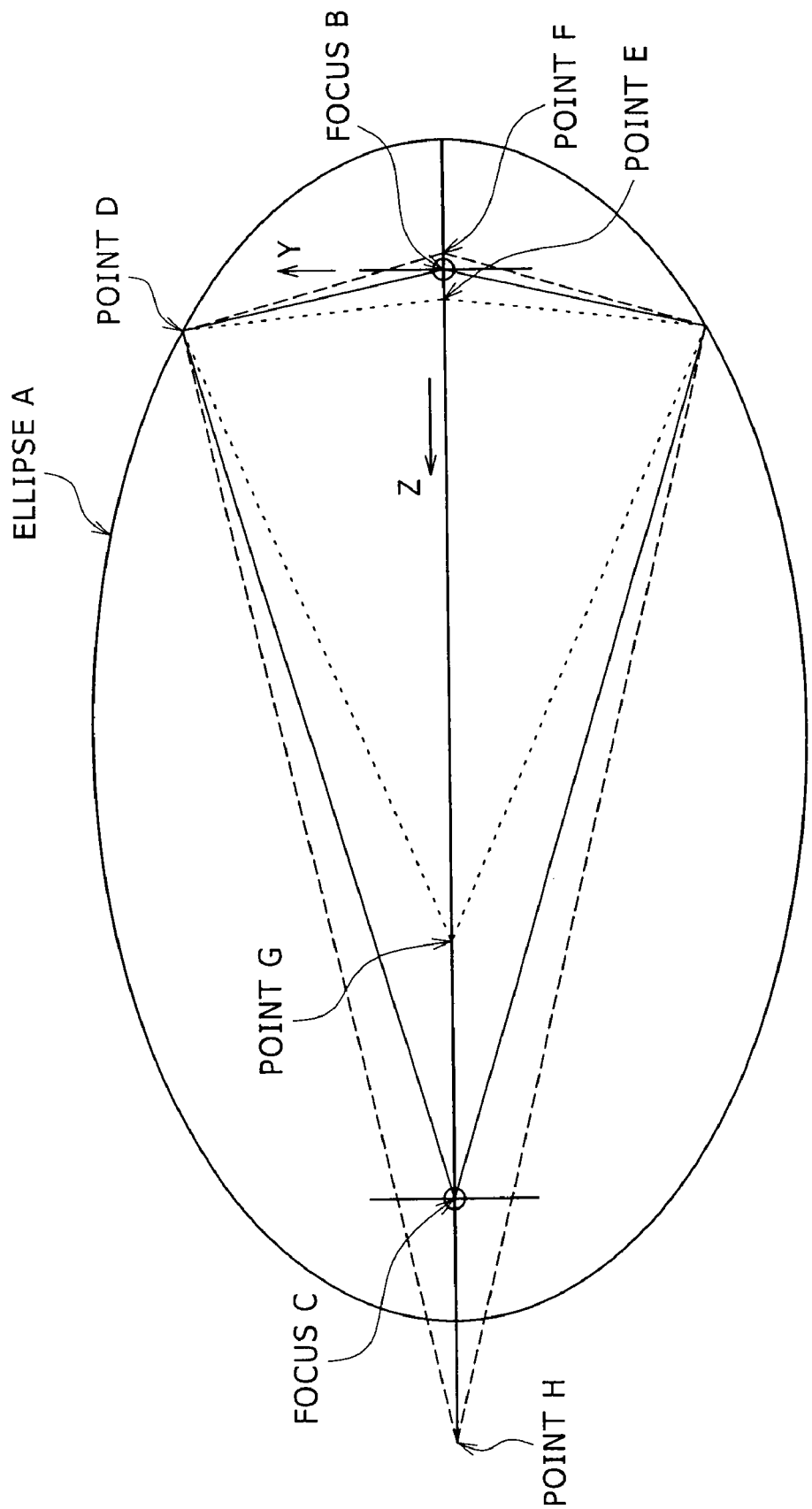
FIG. 7 shows details of an ellipse previously shown in FIG. 5, to illustrate a manor of reflection of light by an elliptical mirror.

FIG. 7 shows details of the ellipse A shown in FIG. 5. In other words, FIG. 7 illustrates a manner of reflection of light by the elliptic reflecting mirror 82 with respect to the position of the lamp 83 serving as a light source.

Referring to FIG. 7, in the example shown, light outgoing from the focus B is condensed at the focus C. Further, as indicated by shorter broken lines in FIG. 7, light outgoing from the position of a point E is condensed at a point G, and as indicated by longer broken lines in FIG. 7, light outgoing from the position of a point F is condensed at a point H.

In particular, if it is assumed that the elliptic reflecting mirror 82 is designed such that, when the light source, that is, the bright point of the lamp 83, is positioned at the focus B, if light is condensed at the focus C, then a maximum luminance is obtained, that is, a maximum luminance is approached, then if the position of the bright point of the lamp 83 is moved to the "+" side or the "−" side along the Z direction in FIG. 7, then the light condensing position varies and is displaced from the focus C at which the maximum luminance is obtained. Therefore, the light utilization efficiency drops. In particular, for example, if the position of the bright point of the lamp 83 positioned at the focus B is moved to the "+" side in the Z direction in FIG. 7 to move the position of the bright point of the lamp 83 to the point E, then light outgoing from the point E is condensed at a point G. Therefore, the utilization efficiency of light emitted from the lamp 83 drops. Similarly, if the position of the bright point of the lamp 83 positioned at the focus B is moved to the "−" side in the Z direction, then light outgoing from the point F is condensed at the point H. Therefore, the utilization efficiency of the light emitted from the lamp 83 drops similarly.

In other words, by displacing the light condensing position intentionally from the position at which a maximum luminance is obtained, the utilization efficiency of light emitted from the lamp 83 can be dropped similarly. Consequently, for example, also outside the adjustment range of 50% to 100% in FIG. 3 described hereinabove, light of brightness corresponding to power outside the range can be emitted by displacing the position of the lamp 83 to intentionally drop the utilization efficiency of light. In particular, in the example of FIG. 3, light of brightness corresponding to electric power lower than 2.1 kW for the lamp A, lower than 1.5 kW for the lamp B and lower than 1.0 kW for the lamp C can be emitted.

It is to be noted that, while, in the example described above, the position of the bright point of the lamp 83 serving as a light source is moved in the Z axis direction, even if the position of the bright point of the lamp 83 is moved in the X direction, Y direction, XZ direction, XY direction or the like, the brightness can be changed. The essential point is that only it is necessary for the condensing point of light from the light source to be displaced from the focus C at which a maximum luminance is obtained, and the light source may be moved in an arbitrary direction.

Figure 8:
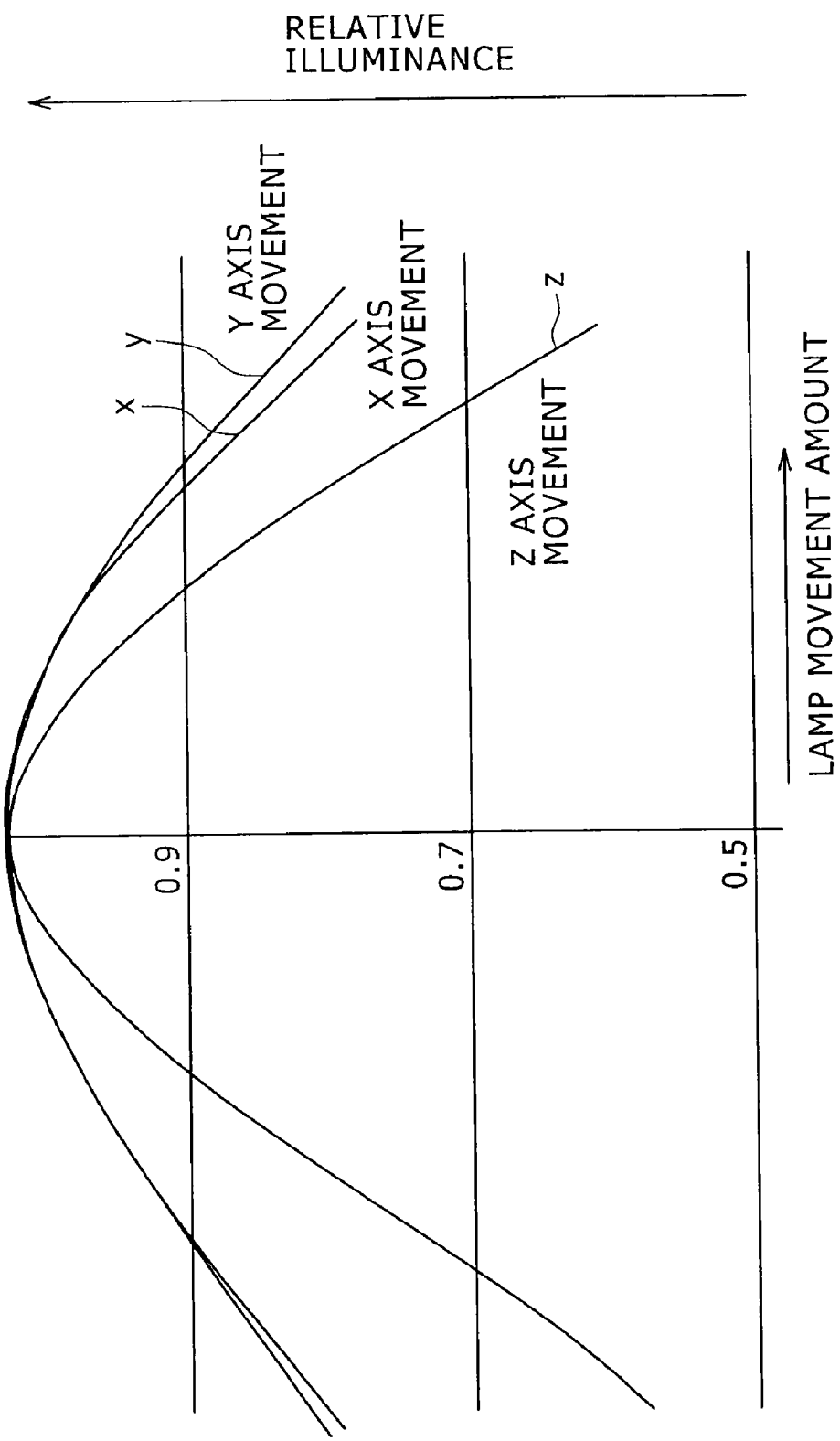
FIG. 8 is a graph of an amount of movement of light versus relative illuminance.

FIG. 8 is a graph illustrating a relationship between the amount of movement of the lamp 83 and the relative illuminance when the lamp 83 is moved in the three directions of the X, Y and Z axes.

Referring to FIG. 8, the axis of abscissa indicates the amount of movement of the lamp 83 and the axis of ordinate indicates the relative illuminance when the lamp 83 is moved in the axial directions of the X, Y and Z axes. From FIG. 8, it can be seen that, where the amount of movement of the lamp 83 is equal in the axial directions of the X, Y and Z axes, the utilization efficiency of light is comparatively high with the axis with regard to which the relative illuminance has a comparatively high value. Further, FIG. 8 indicates curves indicative of the value of the relative illuminance when the bright point of the lamp 83 is moved in the three directions of the X, Y and Z. Among the curves, the curve when the lamp 83 is moved in the X direction is denoted by x; the curve when the lamp 83 is moved in the Y direction by y; and the curve when the lamp 83 is moved in the Z direction by z.

In FIG. 8, the position of a vertical line at the center indicates the position of the lamp 83 when the lamp movement amount is zero, that is, indicates the focus B at which the lamp 83 is positioned and light from the lamp 83 can be condensed at the focus C at which a maximum luminance is obtained. Accordingly, in this instance, since the utilization efficiency of light emitted from the lamp 83 is highest, the relative illuminance exhibits a maximum value with regard to all of the curves x, y and z.

In FIG. 8, if the lamp movement amount increases, that is, if the position of the lamp 83 is spaced away from the focus B, then the relative illuminance gradually decreases. However, the curve x is more moderate than the curve z, and the curve y is more moderate than the curve x.

In other words, where an equal lamp movement amount is considered, the relative illuminance increases in the order of the curve y, curve x and curve z. Therefore, if the lamp 83 is moved, for example, in the Z direction, then the illuminance can be decreased by a greater amount than where the lamp 83 is moved by the same lamp movement amount in the X or Y direction. In other words, if the lamp 83 is moved in the Z direction from among the three directions of the X, Y and Z axes, then the utilization efficiency of light can be decreased most efficiently with respect to the amount of movement of the lamp 83.

In this manner, in the present embodiment, the adjustment range of the light amount can be expanded by moving the lamp 83 merely in any one of the three directions of the X, Y and Z axes without providing an additional part such as an iris mechanism to the optical system. Consequently, a physical restriction by an additional part or the like when an optical iris mechanism is attached newly can be eliminated, and increase of the cost can be suppressed to a minimum level. Further, since an existing mechanism having a function of moving the lamp 83 in the three directions of the X, Y and Z axes can be utilized, the functions mentioned can be implemented very readily.

It is to be noted that, in the present embodiment, by what amount the lamp 83 should be moved in any of the three directions of the X, Y and Z axes is determined depending upon by what amount the utilization efficiency of light should be dropped.

Incidentally, light emitted from the lamp 83 is reflected by the elliptic reflecting mirror 82 as seen in FIG. 9 and emitted, through an illuminating system unit 92 which uniformizes the light, to a liquid crystal light valve apparatus 93 which modulates the light based on digital data of a movie or material to be screened from the material server 32. Then, image data obtained by emitting the light to the liquid crystal light valve apparatus 93 is projected to the screen 34 through a projection lens 94. Consequently, an image corresponding to the digital data provided from the material server 32 is projected from the projector 33 to the screen 34. As a result, the movie is screened on the screen 34.

In FIG. 9, a lamp position adjustment mechanism 91 is composed of, for example, the CPU 51, I/O section 54, motor drive 55, encoder 56 and motor 57 shown in FIG. 4 and adjusts the position of the lamp 83. More particularly, the lamp position adjustment mechanism 91 moves the position of the lamp 83 in the three directions of the X, Y and Z axes in FIG. 9 so that the bright point of the lamp 83 serving as a light source is displaced from the first focus of the elliptic reflecting mirror 82, for example, from the focus B shown in FIG. 5, to decrease the effective light amount of the lamp 83, that is, to displace the condensing point of light from the focus C shown in FIG. 5. In other words, the lamp position adjustment mechanism 91 moves the bright point of the lamp 83 in a direction of the optical axis of the elliptic reflecting mirror 82 or in a direction different from the optical axis of the elliptic reflecting mirror 82.

The liquid crystal light valve apparatus 93 is an image display device such as a liquid crystal light valve apparatus of fixed pixels used for a projector of the light valve type. The image display device may be a liquid crystal panel of the reflection type such as a liquid crystal valve apparatus or a device which can use light emitted from the lamp 83 to display an image corresponding to digital data from the material server 32 such as a mirror device of the reflection type such as a digital mirror device (DMD).

The liquid crystal light valve apparatus 93 modulates light, that is, reflected light, from the lamp 83 reflected by the elliptic reflecting mirror 82 with digital data from the material server 32 to convert the light or reflected light into image light.

The projection lens 94 is used to project the image light from the liquid crystal light valve apparatus 93 to the screen 34 and is provided between the screen 34 and the liquid crystal light valve apparatus 93. The image light from the liquid crystal light valve apparatus 93 is expanded by the projection lens 94 and emitted to the screen 34.

It is to be noted that the projection lens 94 is formed as a group of one or more lenses having a zooming function. In this instance, while the magnitude of an image corresponding to the image light on the screen 34 can be changed by changing the position of the projection lens 94, when the zooming condition is changed, the light of amount sometimes changes to make the luminance of the image on the screen 34 excessively bright. The situation that the image becomes excessively bright can be prevented by adjusting the position of the lamp 83 to lower the utilization efficiency of light.

Further, while the elliptic reflecting mirror 82 having a reflecting face in the form of an elliptic face is described in the description of the present embodiment, it is possible to use a parabolic mirror having a reflecting face in the form of a parabolic face in place of the elliptic reflecting mirror 82. In this instance, since reflection light from the parabolic mirror is parallel light, a luminance variation may not be obtained by movement of the lamp 83 in the Z axis direction. Therefore, the lamp 83 is moved in the X direction or the Y direction to obtain an effect similar to that obtained by the elliptic reflecting mirror 82.

Further, though not shown, a spherical mirror may be provided at a position confronting with the elliptic reflecting mirror 82. In particular, this spherical mirror may be provided to collect overflowing light to raise the efficiency of light emission of the lamp 83.

Now, an example of a process executed when a flicker phenomenon in a low input state occurs during execution of a calibration mode from among various processes executed by the projector 33 having such a configuration as described above is described with reference to a flow chart of FIG. 10. It is to be noted that the process mentioned is hereinafter referred to as flicker detection process.

Figure 10:
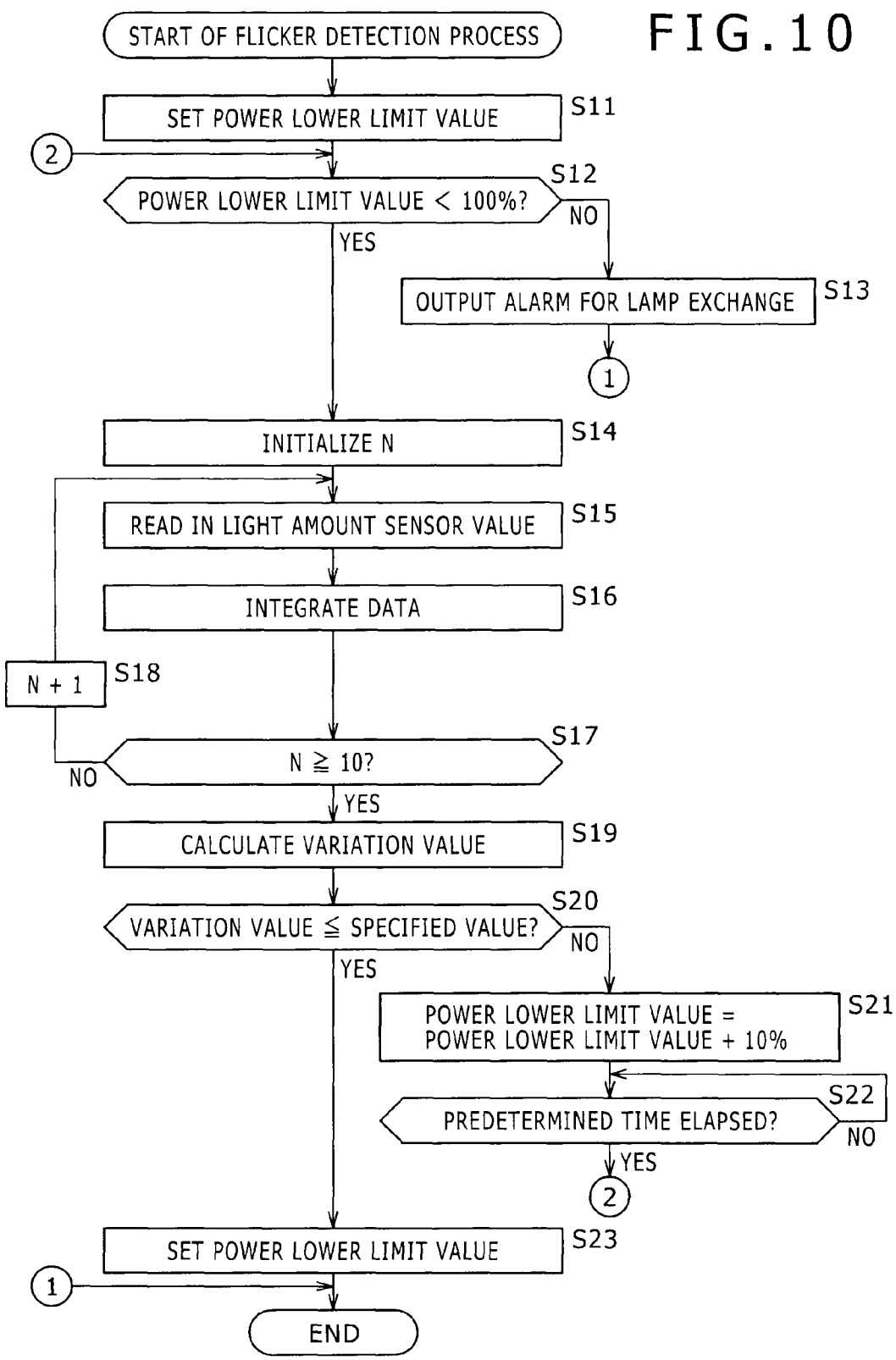
FIG. 10 is a flow chart of a process executed when a flicker phenomenon in a low input state occurs during execution of a calibration mode from among various processes executed by a projector according to an exemplary embodiment.

It is to be noted that, while, in the projector 33, the lamp input is normally set to 50 to 100%, the CPU 51 executes the flicker detection process of FIG. 10, for example, when a calibration mode is carried out.

At step S11, the CPU 51 controls the lamp power supply section 59 through the I/O section 54 to set the power lower limit value, for example, to 50%. For example, information of the power lower limit value set to 50 or the like is stored into the memory 52. Consequently, the lamp 83 mounted on the lamp house 58 is turned on to emit light with the driving power of 50% supplied thereto from the lamp power supply section 59.

At step S12, the CPU 51 decides whether or not the currently set power lower limit value is lower than 100%. If it is decided that the power lower limit value is 100%, then the CPU 51 controls the display section 72 to display an alarm for lamp exchange. Thereafter, the flicker detection process is ended.

In particular, if it is decided that the power lower limit value is 100%, then the power lower limit value may not be raised any more and the flicker phenomenon may not be suppressed any more. Therefore, an alarm for urging the user to exchange the lamp 83 is displayed on the display section 72 so that the user may exchange the lamp 83.

In this manner, a flicker phenomenon is a significant rough estimate for lamp exchange, and if a flicker phenomenon is detected while the power lower limit value is set to 100%, then since an alarm for urging the user to exchange the lamp is outputted, it is possible to notify the user of an appropriate lamp exchanging timing so that otherwise possible failure by bursting of the lamp by normal use can be prevented.

On the other hand, if it is decided at step S12 that the power lower limit value is lower than 100%, then the CPU 51 sets a counter N, for example, to 1 to initialize the counter N at step S14.

Then at step S15, the CPU 51 reads in a light amount sensor value measured by the light amount sensor 60 through the I/O section 54. Then at step S16, the CPU 51 integrates data corresponding to the light amount sensor value thus read in.

At step S17, the CPU 51 decides whether or not the value of the counter N is equal to or higher than a predetermined number such as, for example, 10. If it is decided at step S17 that the value of the counter N is lower than 10, then the CPU 51 increments the value of the counter N by one at step S18. Thereafter, the processing returns to step S15.

Consequently, the processes at steps S15 to S18 are repeated until after it is decided at step S17 that the value of the counter N becomes equal to or higher than 10. In other words, the processes at steps S15 to S18 are repeated 10 times at fixed intervals until the value of the counter N becomes equal to or higher than 10 which is the predetermined number of times. Therefore, 10 integrated values are determined by the process at step S16.

After a predetermined number of integrated values such as 10 integrated values are determined, the CPU 51 calculates a variation value based on the integrated values at step S19. This variation value is calculated, for example, in accordance with the following expression (1):

$$\text{variation value} = (\text{maximum value of integrated value} - \text{minimum value of integrated value})/\text{average value of integrated value} \quad (1)$$

In particular, in the expression (1), maximum and minimum integrated values are selected from among, for example, 10 integrated values, and an average value of the 10 integrated values is calculated. Further, the difference between the selected maximum and minimum integrated values is divided by the calculated average value to calculate the variation value.

At step S20, the CPU 51 decides whether or not the calculated variation value is equal to or lower than a specified value determined in advance.

Here, the specified value is determined in advance, for example, by a manufacturer of the projector 33 or the like. In particular, according to the specification, a reference or threshold value for deciding occurrence of a flicker is determined, and if the calculated variation value exceeds the reference, then it is decided that a flicker phenomenon currently occurs.

If it is decided at step S20 that the variation value is higher than the specified value, then the CPU 51 increases the power lower limit value by 10% at step S21. Then at step S22, the CPU 51 decides whether or not a predetermined interval of time such as one minute, elapses. Then, the deciding process at step S22 is repeated until after it is decided at step S22 that the predetermined interval of time elapses.

In particular, if it is decided that the variation value is higher than the specified value, then this indicates that a flicker phenomenon is currently proceeding. Since a flicker phenomenon has a nature that it stops if the power of the lamp 83 is raised as described hereinabove, the power lower limit value is changed from 50% to 60% to raise the power of the lamp 83 for 10%.

If it is decided at step S22 that the predetermined interval of time such as one minute elapses, then the processing returns to step S12 to repeat the processes described above.

Then, the processes at steps S12 to S22 described above are repeated until after it is decided at step S22 that the predetermined interval of time such as one minute elapses. In particular, while the power lower limit value is increased successively by 10% like 60%, 70%, 80% and 90%, the variation value of the amount of light emitted from the lamp 83 which is turned on to emit light is successively calculated, and comparison between the calculated variation value and the specified value is carried out successively.

If it is decided at step S20 that the variation value is equal to or lower than the specified value, then the CPU 51 sets the power lower limit value to a power lower limit value for the case wherein the variation value is equal to or lower than the specified value, for example, to 90% at step S23. Thereafter, the flicker detection process is ended.

As described above, when a flicker phenomenon which occurs upon low input power driving is detected, the power lower limit value or lamp input value is successively increased until the flicker phenomenon disappears. By this, a flicker which occurs upon low input power driving can be suppressed, and a sufficient lamp life upon low input power driving can be assured. In other words, the flicker phenomenon problem can be solved.

Further, to extend the lamp life upon low input power driving against a flicker provides also an effect that the lamp life is substantially extended. Furthermore, a flicker can be used as a significant rough estimate for lamp exchange, and to issue an alarm for urging the user for lamp exchange upon detection of a flicker with a 100% power input is significant from the point of view of prevention of bursting of the lamp by excessive use.

Now, a process of moving the lamp 83, which is executed when the adjustment range of the amount of light emitted from the lamp 83 is expanded, from among the processes executed by the projector 33 having the configuration described hereinabove is described with reference to FIG. 11. It is to be noted that the process mentioned is hereinafter referred to as lamp position adjustment process.

As described hereinabove, it is prescribed that, when the size of an image to be projected on the screen 34 of the screening place 22 is changed over from the scope size to the vista size, the luminance of the image to be projected on the screen 34 is kept fixed between the two different angles of field, and in order to implement this, it is necessary to assure the light amount gain of the lamp 83 at 1.6. The CPU 51 thus executes the lamp position adjustment process of FIG. 11, for example, if it is necessary to keep the luminance of an image to be projected on the screen 34 whose image size is changed over to the vista size at a desired value after the flicker detection process of FIG. 10 comes to an end.

At step S31, the CPU 51 reads in a light amount sensor value measured by the light amount sensor 60 through the I/O section 54 and decides whether or not the light emitted from the lamp 83 is excessively bright. In particular, the CPU 51 decides whether or not the light amount sensor value from the light amount sensor 60 for detecting, for example, the amount of light emitted to the screen 34 after changeover to the vista size, is equal to or higher than a value demanded for the vista size to decide whether or not the light from the lamp 83 is excessively bright.

If it is decided at step S31 that the light emitted from the lamp 83 is not excessively bright, that is, that the light has a desired level of brightness, then since there is no necessity to adjust the position of the lamp 83, processes at steps S32 to S35 are skipped and the lamp position adjustment process is ended immediately.

On the other hand, if it is decided at step S31 that the light emitted from the lamp 83 is excessively bright, then the CPU 51 decides at step S32 whether or not the position of the lamp 83 is within a limit range within which it is movable. If it is decided at step S32 that the position of the lamp 83 is outside the limit range, then since the lamp 83 may not be moved any more, the lamp position adjustment process is ended.

On the other hand, if it is decided at step S32 that the position of the lamp 83 is within the limit range, then since it is possible to move the lamp 83, the CPU 51 acquires a light amount sensor value and position data from the light amount sensor 60 and the encoder 56, respectively, through the I/O section 54.

At step S34, the CPU 51 controls the motor 57 through the I/O section 54 and the motor drive 55 based on the light amount sensor value and position data acquired as described above to drive the electric power section 81 thereby to move the lamp 83 in one of the three directions of the X, Y and Z axes.

It is to be noted that, as a method of shifting the lamp 83 to adjust the position of the lamp 83, for example, an optimum value of the position to which the lamp 83 is to be shifted is recognized by the encoder 56, and every time the angle of field is changed over, the position of the lamp 83 is changed over based on the recognized optimum value so that the luminance of the image to be projected on the screen 34 can be kept fixed.

Further, in the present embodiment, the electric power section 81 has a movable amount with which the lamp gain of 1.6 can be implemented only by movement of the position of the lamp 83 while the input is kept at 100%.

At step S35, the CPU 51 decides based on the light amount sensor value from the light amount sensor 60 after the movement of the position of the lamp 83 whether or not the amount of light emitted from the lamp 83 is lower than the desired luminance. If it is decided at step S35 that the amount of light emitted from the lamp 83 still remains equal to or higher than, for example, the value requisite for the vista size and the luminance on the screen 34 is equal to or higher than the desired luminance, then the processing returns to step S32. Consequently, the processes at steps S32 to S35 described above are repeated until after it is decided at step S35 that the luminance on the screen 34 is lower than the desired luminance.

On the other hand, if it is decided at step S35 that the luminance on the screen 34 is lower than the desired luminance, then the luminance is equal to or lower than the value demanded, for example, for the vista size, and since the luminance of the image projected on the screen 34 can be kept fixed, the lamp position adjustment process is ended.

As described above, the adjustment range of the light amount can be expanded only by moving the lamp 83 in any one of the three directions of the X, Y and Z axes to adjust the position of the lamp 83 without providing an additional part of an iris mechanism and so forth on the optical system. In other words, by moving the lamp 83 in any one of the three directions of the X, Y and Z axes to positively degrease the effective light amount of the liquid crystal light valve apparatus 93, the adjustment range of the peak luminance can be expanded without damaging the gradation of the liquid crystal light valve apparatus 93. In other words, the lamp adjustment range problem can be solved.

On the other hand, for example, if the angle of field or aspect ratio of the movie is changed, then in order to keep the luminance of the image on the screen 34 fixed, it becomes necessary to adjust the amount of light to be emitted from the lamp 83. In this instance, after the flicker detection process of FIG. 10 is executed, the lamp position adjustment process of FIG. 11 is carried out to displace the position of the lamp 83 in a direction in which the image projected on the screen 34 becomes dark. By this, the luminance of the image can be kept fixed readily. Consequently, the flicker phenomenon problem and the lamp adjustment range problem can be solved simultaneously. For example, if adjustment of the light output of the lamp 83 within the range from 100% to approximately 50% by the flicker detection process of FIG. 10 is carried out additionally, then a range of the luminance from 100% to approximately 30% of the maximum luminance can be made the adjustment range.

Further, while the lamp 83 may have any lamp size from among various lamp sizes as described above, since the adjustment range of the light amount can be expanded, the number of types of the lamp 83 can be reduced.

It is to be noted that, while, in the embodiment described above, the adjustment range of the light amount can be expanded by adjusting the position of the lamp 83, similar effects can be anticipated also by moving or rotating the elliptic reflecting mirror 82 or the illuminating system unit 92 in place of the movement of the lamp 83.

Further, in the projector 33 of FIG. 4, it is possible to use an external personal computer or like apparatus to input data or display data without providing the inputting/outputting section 53 including the inputting section 71 and the display section 72.

Further, while, in the embodiment described above, changeover of the angle of field according to the DCI Spec is described, also changeover of the angle of field according to other standards can be applied effectively where screening involves changeover of the angle of field.

It is to be noted that, while the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium is formed from the removable medium 64 shown in FIG. 4 which may be a magnetic disc (including a flexible disc), an optical disc (including a CD-ROM (Compact Disc-Read Only Memory) and a DVD (Digital Versatile Disc)), or a magneto-optical disc (including an MD (MINI DISC) (Registered Trademark of Sony Corporation), or a semiconductor memory which has the program recorded thereon or therein and is distributed to provide the program to a user separately from a computer. Else, the recording medium is formed as a ROM, a recording section or the like in which the program is recorded and which is provided to a user in a state wherein the program is incorporated in a computer in advance.

Further, the program for causing the series of processes described hereinabove to be executed may be installed into a computer through an interface such as a router or a modem and further through a wired or wireless communication medium such as a local area network, the Internet or a digital satellite broadcast as occasion demands.

It is to be noted that, in the present specification, the steps which describe the program recorded in a recording medium may be but need not necessarily be processed in a time series in the order as described, and include processes which are executed in parallel or individually without being processed in a time series.

Further, in the present specification, the term "system" is used to represent an entire apparatus composed of a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. A projector for projecting an image to a screen, comprising:
   a lamp configured to emit light;
   an elliptic reflecting mirror configured to reflect and condense the light from said lamp;
   an image display device configured to modulate the light reflected and condensed by said elliptic reflecting mirror with image data corresponding to the image to convert the reflected light into image light;
   a projection lens disposed between said screen and said image display device and configured to project the image light from said image display device to said screen; and
   a position adjustment mechanism configured to displace a bright point of said lamp from a first focus of said elliptic reflecting mirror to adjust a position of said lamp so as to decrease an effective light amount of said image display device to approximately 30%.

2. The projector according to claim 1, wherein said position adjustment mechanism is configured to move the bright point of said lamp on an optical axis of said elliptic reflecting mirror.

3. The projector according to claim 1, wherein said position adjustment mechanism is configured to move the bright point of said lamp in a direction different from that of an optical axis of said elliptic reflecting mirror.

4. The projector according to claim 1, wherein said position adjustment mechanism is configured to adjust the position of said lamp in response to a change in an aspect ratio of the image to be displayed on said screen.

5. The projector of claim 1, wherein the position adjustment mechanism includes a motor.

6. The projector of claim 1, further comprising a light sensor configured to measure an amount of light emitted from the lamp.

7. The projector of claim 6, wherein the position adjustment mechanism adjusts the position of said lamp in response to the amount of light measured by the light sensor.

8. The projector of claim 6, further comprising:
   a motor configured to drive the position adjustment mechanism; and
   a controller configured to receive a value representing the amount of light measured by the light sensor and to drive the motor.

9. A control method for a projector to project an image to a screen, the projector including a lamp configured to emit light, an elliptic reflecting mirror configured to reflect and condense the light from the lamp, an image display device configured to modulate the light reflected and condensed by the elliptic reflecting mirror with image data corresponding to the image to convert the reflected light into image light, a projection lens disposed between the screen and the image display device and configured to project the image light from the image display device to the screen, and a position adjustment mechanism configured to adjust a position of the lamp, the control method comprising the step, executed by a control circuit, of:
   displacing the bright point of the lamp from a first focus of the elliptic reflecting mirror to adjust the position of the lamp so as to decrease the effective light amount of the image display device, wherein
   the position adjustment mechanism is configured to adjust the position of the lamp such that the step of displacing the bright point of the lamp can decrease the effective light amount of the image display device to 30%.

10. The control method of claim 9, wherein the position adjustment mechanism includes a motor.

11. The control method of claim 9, wherein the effective light amount is decreased to approximately 30%.

12. The control method of claim 9, further comprising measuring an amount of light emitted from the lamp with a light sensor.

13. The control method of claim 12, further comprising adjusting the position of said lamp, using the position adjustment mechanism, in response to the amount of light measured by the light sensor.

14. The control method of claim 13, wherein adjusting the position of said lamp includes adjusting the position of said lamp using a motor operated by a controller.

15. The control method of claim 9, further comprising adjusting a position of the lamp in response to a change in an aspect ratio of the image to be displayed on said screen.

16. A projector for projecting an image, comprising:

a lamp configured to emit light;

a reflecting mirror configured to reflect and condense the light from said lamp;

an image display device configured to modulate the light reflected and condensed by said reflecting mirror with image data corresponding to the image to convert the reflected light into image light; and a position adjustment mechanism configured to displace a bright point of said lamp from a first focus of said reflecting mirror to adjust a position of said lamp so as to decrease an effective light amount of said image display device in response to a change in an aspect ratio of the image.

* * * * *